United States Patent
Kim et al.

(10) Patent No.: US 11,145,088 B2
(45) Date of Patent: Oct. 12, 2021

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Sanghee Kim, Suwon-si (KR); Kyeongwon Mun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 41 days.

(21) Appl. No.: 16/601,970

(22) Filed: Oct. 15, 2019

(65) Prior Publication Data
US 2020/0134874 A1 Apr. 30, 2020

(30) Foreign Application Priority Data
Oct. 31, 2018 (KR) .................. 10-2018-0132175

(51) Int. Cl.
*G06T 7/00* (2017.01)
*G06T 9/00* (2006.01)
(Continued)

(52) U.S. Cl.
CPC .............. *G06T 7/97* (2017.01); *G06T 7/40* (2013.01); *G06T 7/73* (2017.01); *G06T 7/90* (2017.01); *G06T 9/002* (2013.01); *G06T 2207/20081* (2013.01); *G06T 2207/20084* (2013.01); *G06T 2207/30181* (2013.01); *G06T 2207/30196* (2013.01)

(58) Field of Classification Search
CPC .... G06T 7/97; G06T 7/73; G06T 7/90; G06T 7/40; G06T 9/002; G06T 2207/20081; G06T 2207/20084; G06T 2207/30181; G06T 2207/30196
See application file for complete search history.

(56) References Cited

U.S. PATENT DOCUMENTS 8,755,596 B2   6/2014  Datta et al.
9,536,293 B2   1/2017  Lin et al.
(Continued)

FOREIGN PATENT DOCUMENTS

CN      105718960      6/2016
JP      2018-81692     5/2018
(Continued)

OTHER PUBLICATIONS

International Search Report and Written Opinion of the International Searching Authority dated Jan. 29, 2020 in International Patent Application No. PCT/KR2019/013556.

*Primary Examiner* — Mia M Thomas
(74) *Attorney, Agent, or Firm* — Staas & Halsey LLP

(57) ABSTRACT

An artificial intelligence (AI) system utilizing machine learning algorithm and application of an electronic apparatus includes a memory and a processor to store at least one obtained image in the memory, and based on the at least one image being classified on a basis of an aesthetic score through an AI model, sort and provide the at least one image based on the classification result, and the AI model may include a plurality of layers with different depths, extract a feature of the at least one image from each of the plurality of layers, and classify the at least one image on a basis of the aesthetic score in accordance with the plurality of extracted features.

17 Claims, 16 Drawing Sheets

(51) Int. Cl.
  *G06T 7/73* (2017.01)
  *G06T 7/90* (2017.01)
  *G06T 7/40* (2017.01)

(56) References Cited

U.S. PATENT DOCUMENTS

| | | | |
|---|---|---|---|
| 10,049,308 B1* | 8/2018 | Dhua | G06N 3/0472 |
| 10,346,726 B2 | 7/2019 | Han et al. | |
| 10,467,504 B1* | 11/2019 | Hamedi | G06K 9/6215 |
| 10,878,550 B2* | 12/2020 | Shen | G06T 7/0002 |
| 2011/0075930 A1 | 3/2011 | Cerosaletti et al. | |
| 2016/0098618 A1* | 4/2016 | Shaji | G06F 16/5838 |
| | | | 382/160 |
| 2016/0098844 A1* | 4/2016 | Shaji | G06T 9/00 |
| | | | 382/156 |
| 2016/0171346 A1 | 6/2016 | Han et al. | |
| 2016/0300125 A1* | 10/2016 | Barker | G06T 7/0004 |
| 2017/0294010 A1* | 10/2017 | Shen | G06K 9/6256 |
| 2018/0039879 A1 | 2/2018 | Shaji et al. | |
| 2018/0068218 A1 | 3/2018 | Yoo et al. | |
| 2018/0137201 A1 | 5/2018 | Longbin et al. | |
| 2018/0184062 A1* | 6/2018 | Hariri | G06T 7/90 |
| 2019/0108621 A1* | 4/2019 | Condorovici | G06K 9/6256 |
| 2019/0279052 A1 | 9/2019 | Han et al. | |
| 2019/0295223 A1* | 9/2019 | Shen | G06K 9/6256 |
| 2020/0257938 A1* | 8/2020 | Hamedi | G06K 9/46 |
| 2020/0272864 A1* | 8/2020 | Faust | G06K 9/3233 |
| 2020/0372715 A1* | 11/2020 | Sawhney | G06T 15/506 |
| 2021/0011476 A1* | 1/2021 | Ban | G06T 7/74 |

FOREIGN PATENT DOCUMENTS

| | | |
|---|---|---|
| KR | 10-2016-0072768 | 6/2016 |
| KR | 10-2018-0027887 | 3/2018 |
| KR | 10-2018-0087735 | 8/2018 |

* cited by examiner

ELECTRONIC APPARATUS AND METHOD FOR CONTROLLING THEREOF

CROSS-REFERENCE TO RELATED APPLICATIONS

This application claims is based on and claims priority under 35 U.S.C. § 119 to Korean Patent Application No. 10-2018-0132175, filed on Oct. 31, 2018, in the Korean Intellectual Property Office, the disclosure of which is incorporated herein by reference in its entirety.

BACKGROUND

1. Field

The disclosure relates to an electronic apparatus and a method for controlling thereof and, more particularly, to an electronic apparatus which operates based on an artificial intelligence (AI) technology and a method for controlling thereof.

2. Description of the Related Art

An artificial intelligence (AI) systems are systems implementing intelligence of a human level. In the AI system, a machine learns and determines, and the AI system shows a more improved recognition rate as iterations are performed.

The AI technology consists of machine learning (deep learning) which uses an algorithm technology of classifying/learning the characteristics of input data, and an element technology of simulating functions of a human brain such as cognition and determination by using a machine learning algorithm.

Element technologies include at least one of, for example, a language understanding technique for recognizing a human language/character, a visual understanding technique for recognizing an object as a human vision, a reasoning/prediction technique for reasoning and predicting information to logically infer and predict information, a knowledge representation technique for processing experiential information of a human as knowledge data, and an operation control technique for controlling autonomous travel of the vehicle and movement of a robot.

Visual understanding is a technique for recognizing and processing objects as human vision, including object recognition, object tracking, image search, human recognition, scene understanding, spatial understanding, image enhancement, and the like.

Inference prediction is a technique for judging and logically inferring and predicting information, including knowledge/probability based inference, optimization prediction, preference-based planning, and recommendation.

Recently, an electronic apparatus for classifying an image using the AI technology has been developed.

The related-art electronic apparatus is used to merely implement a technology for identifying an object included in an image. For example, when a plurality of images including a dog and/or a cat are input, the related-art electronic apparatus classifies and provides only an image including a dog or an image including a cat.

However, it is general that a user desires to receive an image that is highly aesthetic among a plurality of images, rather than a photo classified according to objects included in the image.

That is, in the above-described embodiment, the user desires not to receive images that are randomly arranged and include the dog only, but to preferentially receive an image taken with a natural angle among photos including the dog.

SUMMARY

Embodiments may overcome the above disadvantages and other disadvantages not described above. Also, an embodiment is not required to overcome the disadvantages described above, and an embodiment may not overcome any of the problems described above.

The object of the disclosure is to arrange a plurality of images in a descending order of an aesthetic score and provide a user with the images.

According to an embodiment, an electronic apparatus includes a memory and a processor to store at least one obtained image in the memory, based on the at least one image being classified on a basis of an aesthetic score through an artificial intelligent (AI) model, arrange the at least one image based on the aesthetic score and provide the arranged at least one image, and the AI model may include a plurality of layers with different depths, extract a feature of the at least one image from each of the plurality of layers, and classify the at least one image according to the aesthetic score based on the plurality of extracted features.

The plurality of layers may include a first layer and a second layer that is relatively deeper than the first layer, and the AI model may extract a first feature of the at least one image from the first layer, and extract a second feature of the at least one image from the second layer, the second feature being relatively comprehensive than the first feature.

The processor may, based on a style of the at least one image being classified through the AI model, arrange the at least one image based on the style and the aesthetic score and provide the arranged at least one image.

The plurality of layers may include a first layer and a second layer that is relatively deeper than the first layer, and the AI model may classify the at least one image according to the aesthetic score based on the first feature extracted from the first layer and the second feature extracted from the second layer, and classify a style of the at least one image based on a third feature extracted from the second layer.

The processor may provide the at least one image arranged based on the aesthetic score, provide an image with relatively highest aesthetic score from among the at least one image, or sequentially provide an image in a descending order of the aesthetic score in a predetermined time interval.

The processor may arrange the at least one images according to the aesthetic score by the styles and provide arranged the at least one images.

The processor may, based on different images being respectively classified to a first style and a second style, identify correlation of the first style and the second style, based on identifying the first style and the second style are correlated, group the different images and arrange the images according to the aesthetic score and provide the arranged images.

The aesthetic score may be identified based on at least one of an angle of an object included in the at least one image, diversity of colors included in the image, and a photographing technique applied to the image, and the style may be identified based on at least one of a human, an animal, a building, and a landscape included in the at least one image.

According to an embodiment, a method for controlling of an electronic apparatus includes obtaining at least one image, based on the at least one image being classified on a basis of an aesthetic score through an artificial intelligent (AI) model, arranging the at least one image based on the aesthetic score, and providing arranged the at least one image, and the AI model may include a plurality of layers with different depths, extract a feature of the at least one image from each of the plurality of layers, and classify the at least one image according to the aesthetic score based on the plurality of extracted features.

The plurality of layers may include a first layer and a second layer that is relatively deeper than the first layer, and the AI model may extract a first feature of the at least one image from the first layer, and extract a second feature of the at least one image from the second layer, the second feature being relatively comprehensive than the first feature.

The providing may include, based on a style of the at least one image being classified through the AI model, arranging the at least one image based on the style and the aesthetic score and providing the arranged at least one image.

The plurality of layers may include a first layer and a second layer that is relatively deeper than the first layer, and the AI model may classify the at least one image according to the aesthetic score based on the first feature extracted from the first layer and the second feature extracted from the second layer, and classify a style of the at least one image based on a third feature extracted from the second layer.

The providing may include providing the at least one image arranged based on the aesthetic score, providing an image with relatively highest aesthetic score from among the at least one image, or sequentially providing an image in a descending order of the aesthetic score in a predetermined time interval.

The providing may include arranging the at least one images according to the aesthetic score by the styles and providing the arranged at least one images.

The providing may include, based on different images being respectively classified to a first style and a second style, identifying correlation of the first style and the second style, based on identifying the first style and the second style are correlated, grouping the different images and arranging the images according to the aesthetic score, and providing the arranged images.

The aesthetic score may be identified based on at least one of an angle of an object included in the at least one image, diversity of colors included in the image, and a photographing technique applied to the image, and the style may be identified based on at least one of a human, an animal, a building, and a landscape included in the at least one image.

According to the various embodiments as described above, a plurality of images may be arranged in a descending order of the aesthetics and provided. In addition, a plurality of images may be divided by styles and provided and thus, a user may appreciate images that are harmoniously arranged.

BRIEF DESCRIPTION OF THE DRAWINGS

The above and/or other aspects, features, and advantages of certain embodiments of the disclosure will be more apparent from the following description taken in conjunction with the accompanying drawings, in which.

DETAILED DESCRIPTION

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

When it is decided that a detailed description for the known art related to the disclosure may unnecessarily obscure the gist of the disclosure, the detailed description will be shortened or omitted.

Embodiments of the disclosure will be described in detail with reference to the accompanying drawings, but the disclosure is not limited to embodiments described herein.

Hereinafter, the disclosure will be described with reference to the drawings.

Figure 1:
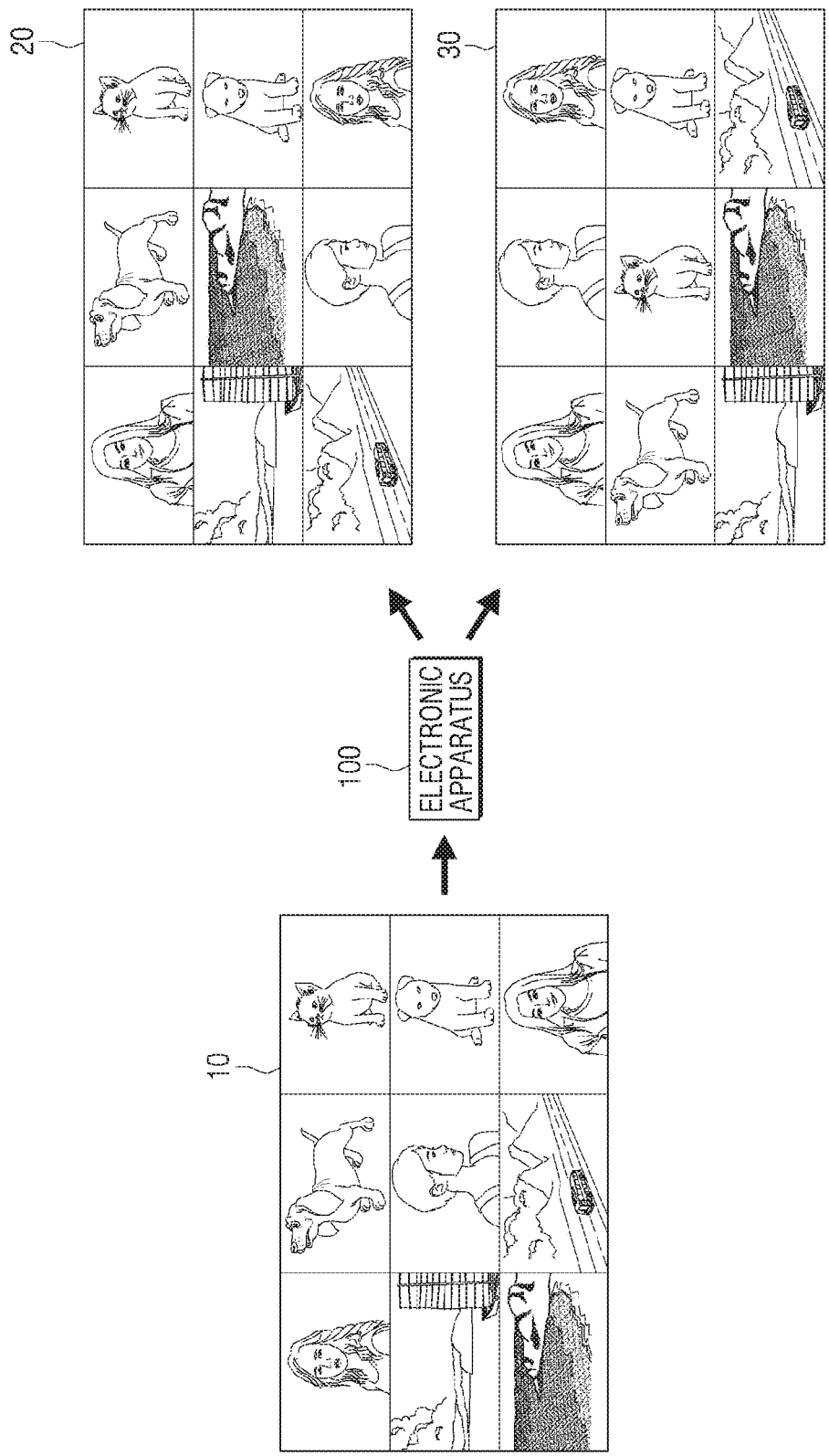
FIG. 1 is a view provided to describe an embodiment in which an electronic apparatus classifies an image according to an embodiment.

FIG. 1 is a view provided to describe an embodiment in which an electronic apparatus classifies an image according to an embodiment.

An electronic apparatus 100 according to an embodiment may be a smart TV. However, this is merely an embodiment, and the electronic apparatus 100 may be implemented as various electronic apparatuses such as a mobile phone, a smartphone, a set-top box, a notebook, a desk-top, a tablet PC, a server, or the like. The electronic apparatus 100 may be a wearable device such as a smart watch, a smart glass, or the like.

The electronic apparatus 100 may store one or a plurality of obtained images 10 in a memory. Specifically, the electronic apparatus 100 may store the image 10 obtained through a camera of the electronic apparatus 100 in a memory, store the image 10 obtained through communication with an external device (not shown) such as a universal serial bus (USB) memory, a secure digital (SD) card, or the like, in a memory, and store the image 10 obtained through communication with a server (not shown) in a memory.

For example, referring to FIG. 1, the electronic apparatus 100 may obtain various images such as an image including a person with a smiling facial expression, an image including a person without a facial expression, an image including a smiling dog, an image including the sea, and store the obtained image in a memory.

The electronic apparatus 100 may arrange and provide the stored image according to an aesthetic score. Specifically, when an image is classified based on the aesthetic score through the AI model, the electronic apparatus 100 may arrange and provide the image stored based on the classification result.

For example, referring to FIG. 1, when the plurality of images 10 are classified based on the aesthetic score through the AI model in an order of an image including a person with a smiling facial expression, an image including a dog with a smiling facial expression, an image including a cat gently sitting, the electronic apparatus 100 may provide an image 20 which arranges the plurality of images 10 in a descending order of the aesthetic score.

The electronic apparatus 100 may arrange and provide a plurality of images by styles according to the aesthetic score.

Specifically, when a style of an image is classified through the AI model, the electronic apparatus 100 may arrange and provide a plurality of images in a descending order of the aesthetic score.

For example, referring to FIG. 1, when a plurality of images 10 are classified into a human style, an animal style, and a landscape style through the AI model, the electronic apparatus 100 may provide an image 30 in which the plurality of images 10 are arranged in a descending order of the aesthetic score by each style.

In the meantime, the image arranged based on the aesthetic score and/or style may be provided through a display provided in the electronic apparatus 100 and provided by an external device (not shown).

Specifically, the electronic apparatus 100 may transmit, to an external device (not shown) such as a smart TV or the like, including a display, an image arranged based on the aesthetic score and/or style, and accordingly, the external device (not shown) may display an image that is arranged based on the score and/or style.

As described above, the disclosure provides a plurality of images arranged in a descending order of aesthetics, and a user may preferentially receive an image of high quality. In addition, the disclosure provides a plurality of images classified by styles and thus, a user may appreciate a harmoniously arranged image.

Figure 2:
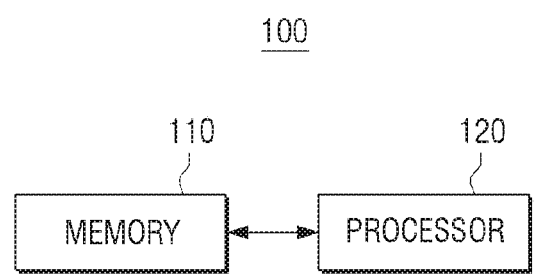
FIG. 2 is a block diagram provided to describe an electronic apparatus according to an embodiment.

FIG. 2 is a block diagram provided to describe an electronic apparatus according to an embodiment.

Referring to FIG. 2, the electronic apparatus 100 according to an embodiment includes a memory 110 and a processor 120.

The memory 110 may include, for example, an internal memory or an external memory. The internal memory may be a volatile memory such as a dynamic random access memory (DRAM), a static random access memory (SRAM), a synchronous dynamic random access memory (SDRAM), or a nonvolatile memory such as one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD).

The external memory may include, for example, a flash derive, a compact flash (CF), secure digital (SD), micro secure digital (micro-SD), mini secure digital (mini-SD), extreme digital (xD), multi-media card (MMC), a memory stick, or the like.

The memory 110 may be accessed by the processor 120, and reading/writing/modifying/deleting/updating of data by the processor 120 may be performed.

The term memory may include at least one of a memory provided separately from the processor 120, a read-only memory (ROM, not shown), a random access memory (RAM, not shown) in the processor 120.

The processor 120 is a configuration for controlling the overall operation of the electronic apparatus 100. For example, the processor may control a plurality of hardware or software components connected to the processor 120 by driving an operating system or an application program, and perform various data processing and operations. The processor 120 may be a central processing unit (CPU), a graphics-processing unit (GPU), or both. For example, the processor 120 may be implemented as at least one of a general processor, a digital signal processor, an application specific integrated circuit (ASIC), a system on chip (SoC), a microcomputer (MICOM), or the like.

The processor 120 may perform an operation of the electronic apparatus 100 according to various embodiments by executing computer executable instructions stored in the memory 110.

For example, if at least one image is classified based on the aesthetic score and style through the AI model, by executing computer executable instructions stored in memory 110, the processor 120 may arrange and provide at least one image based on the classification result.

Hereinbelow, the AI model according to an embodiment will be described first.

Figure 3:
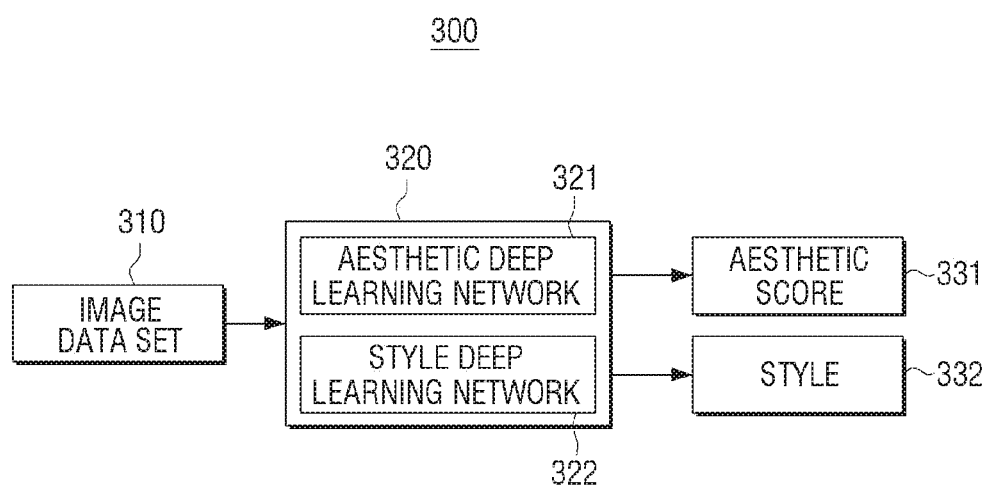
FIG. 3 is a view provided to describe a method for learning an artificial intelligence model according to an embodiment.

FIG. 3 is a view provided to describe a method for learning an artificial intelligence model according to an embodiment.

An AI model 300 according to an embodiment may be a model based on a neural network. For example, the AI model 300 may be a model based on convolution neural network (CNN). This is merely exemplary, and the AI model 300 may be various models such as deep neural network (DNN), recurrent neural network (RNN), bidirectional recurrent deep neural network (BRDNN), or the like.

The AI model 300 may receive an input of a data set 310. Here, the aesthetic score and style may be labelled to each of the plurality of images included in the data set 310.

Specifically, based on an angle of an object included in the image, a variety of colors included in the image, a photographing technique applied to the image, a frame of the image, a lighting effect applied to the image, and originality of the image, or the like, different aesthetic scores may be labeled to each of the plurality of images.

For example, an image with various colors may be labeled with a higher aesthetic score than an image with a black and white color, and an image including a person with a smiling facial expression may be labeled with a higher aesthetic score than an image including a person with a crying facial expression.

Distinct from the aesthetic score, a style such as a person, an animal, a building, a landscape, a color, an emotional expression, or the like, may be labeled on each of a plurality of images.

For example, a person may be labeled to an image including a person, an animal may be labeled to an image including an animal such as a dog, and a landscape may be labeled to an image including a landscape such as the mountain and the sea, or the like.

As such, aesthetic score and store are labeled on each of the plurality of images, and the disclosure may classify the aesthetic score by styles.

A deep learning network 320 of the AI model 300 may be learned to classify an aesthetic score 331 and a style 332 of each of the images included in a data set 310 of an image with the data set 310 as an input, through an aesthetic deep learning network 321 and a style deep learning network 322. This will be described with reference to FIG. 4.

Figure 4:
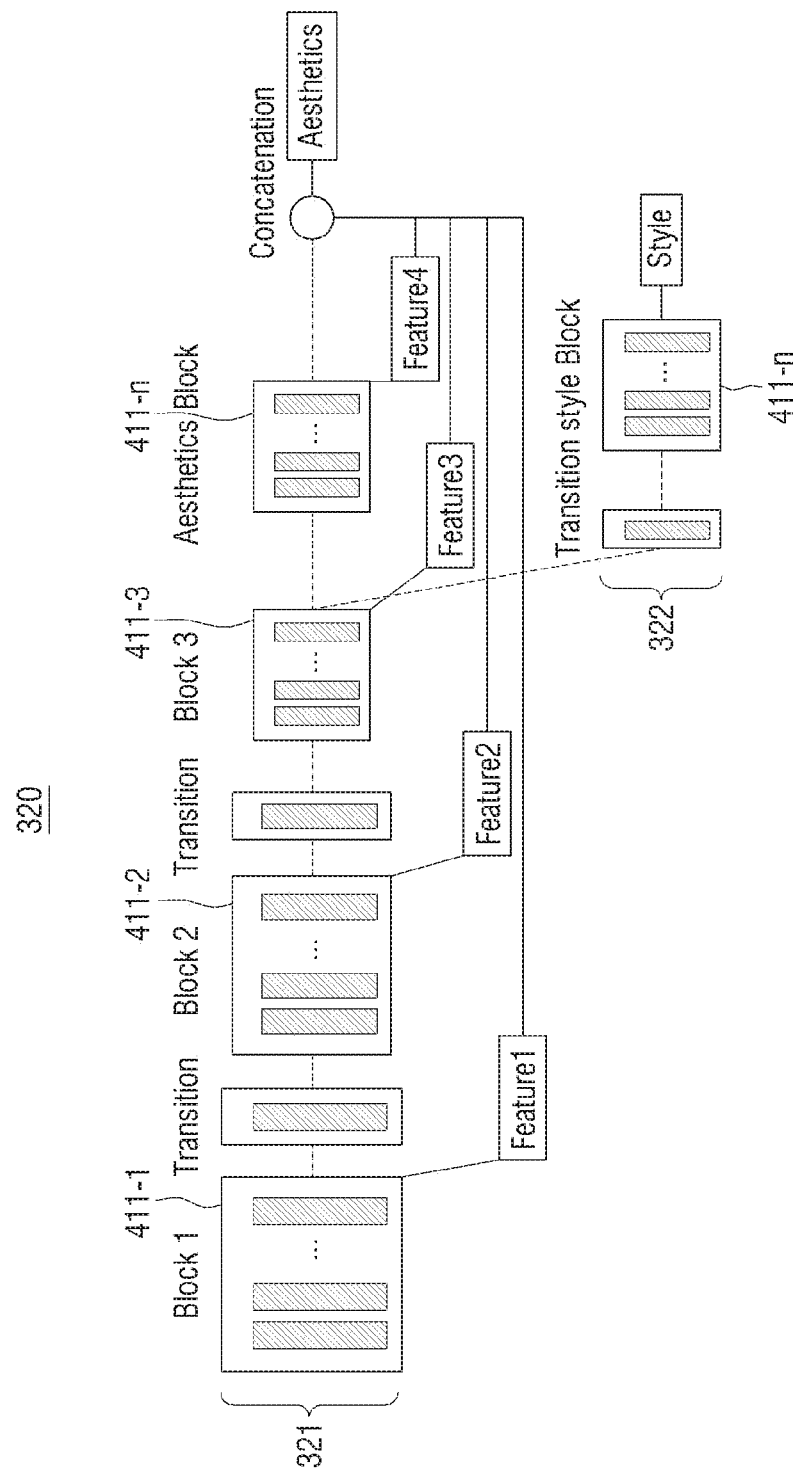
FIG. 4 is a view provided to describe a structure of an artificial intelligence model according to an embodiment.

FIG. 4 is a view provided to describe a structure of an artificial intelligence model according to an embodiment.

The deep learning network 320 of the AI model 300 may include the aesthetic deep learning network 321 and the style deep learning network 322.

The deep learning network 320 may include a plurality of layers having different depths. For example, referring to FIG. 4, the deep learning network 320 may include a first layer 411-1, a second layer 412-2, a third layer 413-3, . . . , and an nth layer 414-n.

Each layer may be a layer including a feature map. Specifically, each layer may include a feature map that is output by convoluting a filter (or a kernel) on an input image. The input image may be further applied with pulling, padding, stride adjustment, or the like, in addition to the convolution of a filter. Herein, the pulling means compressing the layer in the previous step, the padding means filling one pixel every four pixels of the input image with a specific value, and the stride adjustment means adjusting the interval of applying the filter. The convolution layer is merely an embodiment, and the layer of the disclosure may be various layers depending on the AI intelligence model.

The aesthetic deep learning network 321 may extract image features from each of a plurality of layers 411-1 to 411-n having different depths. Specifically, the aesthetic deep learning network 321 may extract the first feature of the image from the first layer 411-1 and extract the second feature of the image from the second layer 411-2.

Accordingly, the aesthetic deep learning network 321 may extract both the detailed feature and the comprehensive feature of the image. Specifically, the aesthetic deep learning network 321 may extract the detailed first feature of the image from the first layer 411-1 and a second feature which is relatively comprehensive than the first feature from the second layer 411-2.

For example, when the obtained image is an image including a tree, the extracted first feature may be a leaf or the like, and the second feature may be a branch or the like, which is relatively comprehensive than a leaf.

In the similar manner, the aesthetic deep learning network 321 may extract the features of the image from each of a third layer 411-3 to the nth layer 411-n.

The aesthetic deep learning network 321 may learn the aesthetic score of the image, based on a plurality of features extracted from each of the plurality of layers 411-1 to 411-n.

Accordingly, when compared to a case in which learning is performed in consideration of only the comprehensive features of the image based solely on a final layer 411-n, the disclosure performs learning in consideration of both the detailed features and the comprehensive features of the image and thus, the aesthetic score may be learned more precisely by images.

In the meantime, in the layer step prior to the final layer 411-n, the layer in the deep learning network 320 may be branched. Specifically, in the layer step prior to the final layer 411-n of the aesthetic deep learning network 321, the layer may be branched to the style deep learning network 322.

Accordingly, as illustrated in FIG. 4, the aesthetic deep learning network 321 and the style deep learning network 322 may jointly use the layer prior to the final layer 411-n that is connected to a hidden layer (not shown), from among a plurality of layers 411-1 to 411-n. That is, the aesthetic deep learning network 321 and the style deep learning network 322 may share a layer prior to the final layer 411-N.

As described above, by jointly using the layer prior to the final layer 411-n, the disclosure may reduce the capacity burden of the memory and operation burden of the processor, as compared to a case where separate deep learning networks are operated in parallel.

In the meantime, the style deep learning network 322 may extract the feature of the image from the final layer 411-n. The extracted feature herein may be the feature about whether an image includes a person, an animal, a landscape, or the like.

The style deep learning network 322 may learn the style of the image based on the feature extracted from the final layer 411-n.

Figure 5:
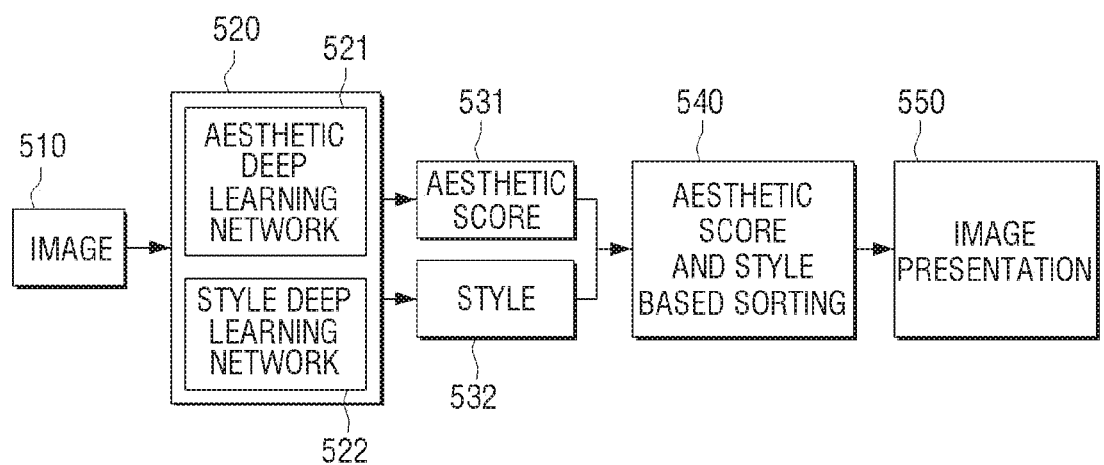
FIG. 5 is a view provided to describe a method for classifying an image according to an aesthetic score and a style according to an embodiment.

FIG. 5 is a view provided to describe a method for classifying an image according to an aesthetic score and a style according to an embodiment.

The deep learning network may classify the aesthetic score and style of a newly input image based on the learned result.

Specifically, referring to FIG. 5, when an image 510 is input, a deep learning network 520 may classify the aesthetic score 531 of the input image through the aesthetic deep learning network 521, and classify the style 532 of the input image through the style deep learning network 522.

Here, the deep learning network 520 may correspond to the deep learning network of FIG. 3, the aesthetic deep learning network 521 may correspond to the aesthetic deep learning network 321 of FIG. 3, and the style deep learning network 522 may correspond to the style deep learning network 322 of FIG. 3.

As described above, the aesthetic deep learning network 521 may classify the aesthetic score of the input image by combining the features extracted from each of the plurality of layers having different depths, and the style deep learning network 522 may classify the style of the input image based on the features extracted from the final layer.

When the aesthetic score and the style of the input image are classified, the processor 120 may arrange an image based on the image score and style 540 and present the arranged image 550.

Hereinbelow, with reference to FIGS. 6 to 11, an embodiment of arranging and providing an image based on the image score and style is described.

Figure 6:
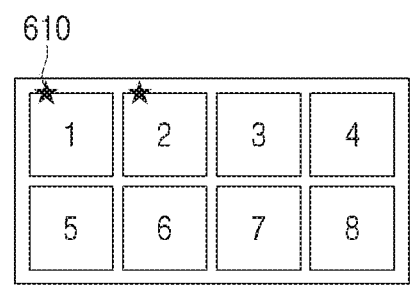
FIG. 6 is a view provided to describe an embodiment of arranging and providing an image based on an aesthetic score according to an embodiment.

FIG. 6 is a view provided to describe an embodiment of arranging and providing an image based on an aesthetic score according to an embodiment.

When the aesthetic score of the plurality of images are classified, the processor 120 may arrange and provide the plurality of images in a descending order of the aesthetic score.

For example, referring to FIG. 6, when it is classified that the aesthetic score becomes lower from the first to eighth images through the AI intelligence model, while the first to eighth image is input, the processor 120 may arrange and provide the images in order of the first to eighth images.

At this time, the processor 120 may display a separate mark in an image having a high aesthetic score. For example, the processor 120 may indicate a star mark in an image with a high aesthetic score and provide the image. According to another embodiment, when an aesthetic score is classified as 90 through the AI model, a corresponding score may be displayed in one region of the image and provided.

Accordingly, a user may receive an image in a descending order of the aesthetic score, and particularly may intuitively recognize an image with a high aesthetic sense. In addition, the aesthetic score is overlapped on the image and displayed, and the user may receive an encouragement for photographing a photo with a high aesthetic score.

Figure 7:
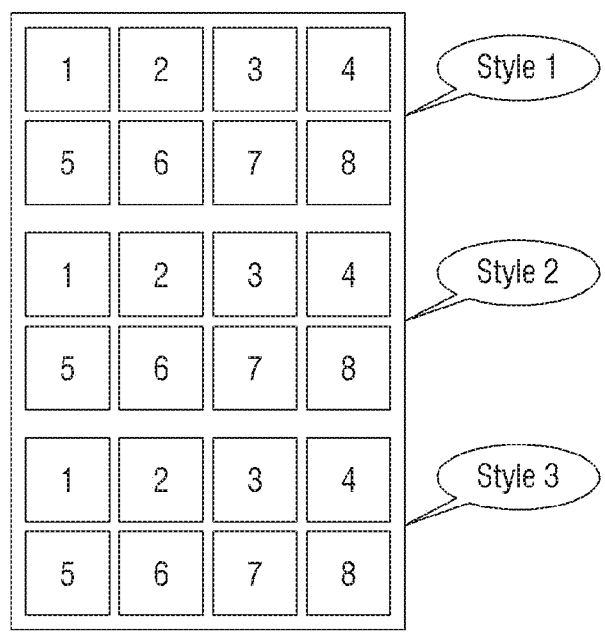
FIG. 7 is a view provided to describe an embodiment of arranging and providing an image by styles based on an aesthetic score according to an embodiment.

FIG. 7 is a view provided to describe an embodiment of arranging and providing an image by styles based on an aesthetic score according to an embodiment.

The processor 120 may group images by styles and provide the images. Specifically, the processor 120 may group the images by stales, and arrange and provide the images in the corresponding group according to the order of aesthetic score.

For example, referring to FIG. 7, the processor 120 may group the first to third styles respectively, arrange and provide the images within the corresponding group according to the order of aesthetic score. Here, the first style may be a human, the second style may be an animal, and the third style may be a landscape, but it is not limited thereto.

As such, by providing images through grouping by styles, a user may easily identify an image with high aesthetic score by styles. In addition, the images are grouped and provided by styles, a user may receive a stable image.

Figure 8:
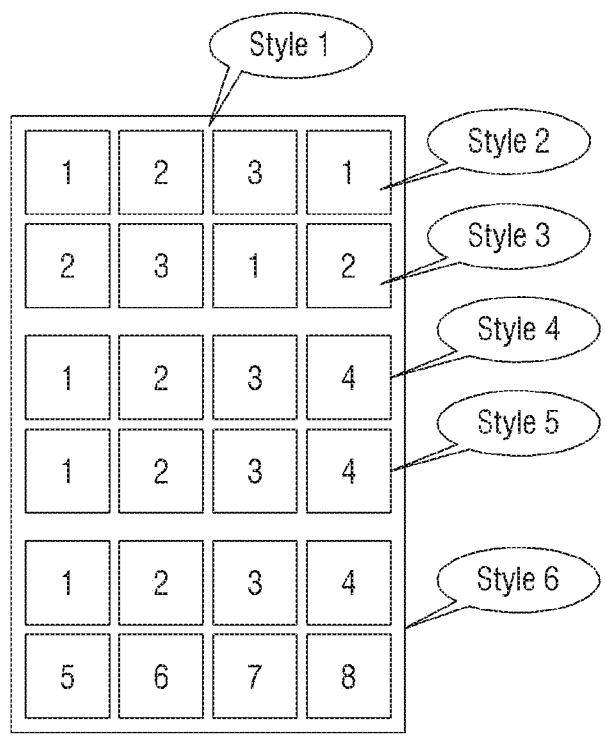
FIG. 8 is a view provided to describe an embodiment of arranging and providing an image by correlated styles based on an aesthetic score.

FIG. 8 is a view provided to describe an embodiment of arranging and providing an image by correlated styles based on an aesthetic score.

If different images are classified into the first style and the second style respectively, the processor 120 may determine the correlation between the first style and the second style.

To be specific, when the different images are classified into the first style and the second style respectively through the AI model, and a distance between the vectors of the first style and the second style is less than or equal to a predetermined distance, the processor 120 may determine that the first style and the second style are correlated with each other.

More specifically, when a vector of first and second styles is displayed on coordinates, the processor 120 may determine that the correlation of the first and second styles is large as the distance between the vectors displayed on the coordinates is shorter, and as the distance between the vectors is farther, the correlation of the first and second styles is small. In the meantime, the determination as described above may be performed by the AI model as well as the processor 120.

When it is determined that the first style and the second style have correlation, the processor 120 may group the images included in the first style and the second style, and arrange and provide the images according to the aesthetic score.

For example, as shown in FIG. 8, if it is determined that the first to third styles have correlation, the fourth and fifth styles have correlation, and the sixth style does not have correlation with another style, the processor 120 may group the first to third styles, arrange and provide the styles according to the aesthetic score, group the fourth and fifth styles, and arrange and provide the styles according to the aesthetic score, and arrange and provide the sixth style separately according to the aesthetic score.

As an embodiment of the first and second styles having the correlation, the first style may be a human and the second style may be a human and an animal, but it is not necessarily limited thereto. As another embodiment, the first style may be the mountain and the second style may be the sea.

By grouping and providing the correlated styles, the disclosure may provide a user with a harmonious image.

Figure 9:
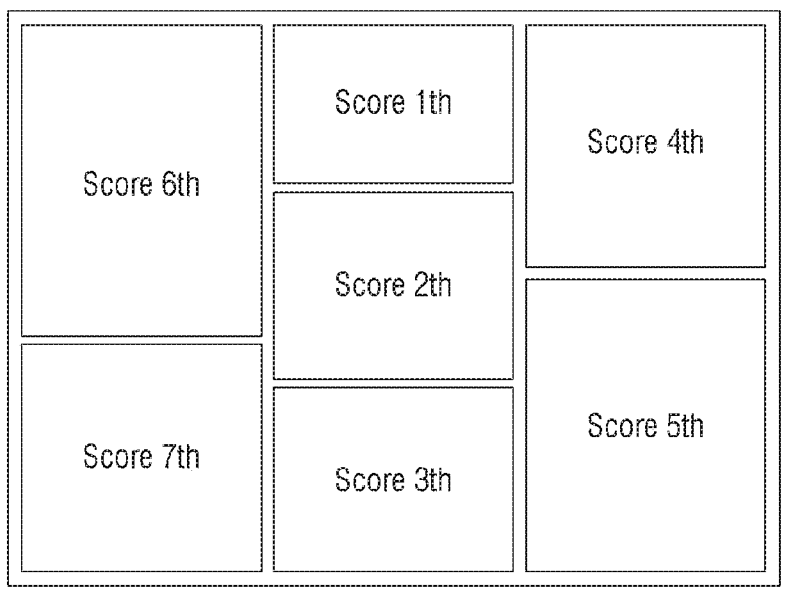
FIG. 9 is a view provided to describe an embodiment of arranging and providing an image based on an aesthetic score according to an embodiment.

FIG. 9 is a view provided to describe an embodiment of arranging and providing an image based on an aesthetic score according to an embodiment.

The processor 120 may arrange and provide a plurality images according to the aesthetic score through various templates. Here, the template may be a template of a different shape or a different size.

For example, as illustrated in FIG. 9, the processor 120 may arrange and provide a plurality of images according to the aesthetic score through square templates in different sizes.

At this time, the processor 120 may arrange an image with a high aesthetic score at a central region of the screen, arrange an image with a second high aesthetic score on a right region of the screen, and arrange an image with a third high aesthetic score at a left region of the screen.

Specifically, the processor 120 may arrange an image from an upper side to a lower side of a central region of a screen in a descending order of the aesthetic score, arrange the image with the second high aesthetic score from the upper side to the lower side of the right region of the screen, and arrange the image with the third high aesthetic score from the upper side to the lower side of the left region of the screen.

This arrangement considers the visual characteristics of a user. By arranging and providing the plurality of images, the disclosure may enable a user to appreciate an image with a descending order of the aesthetic score.

Figure 10:
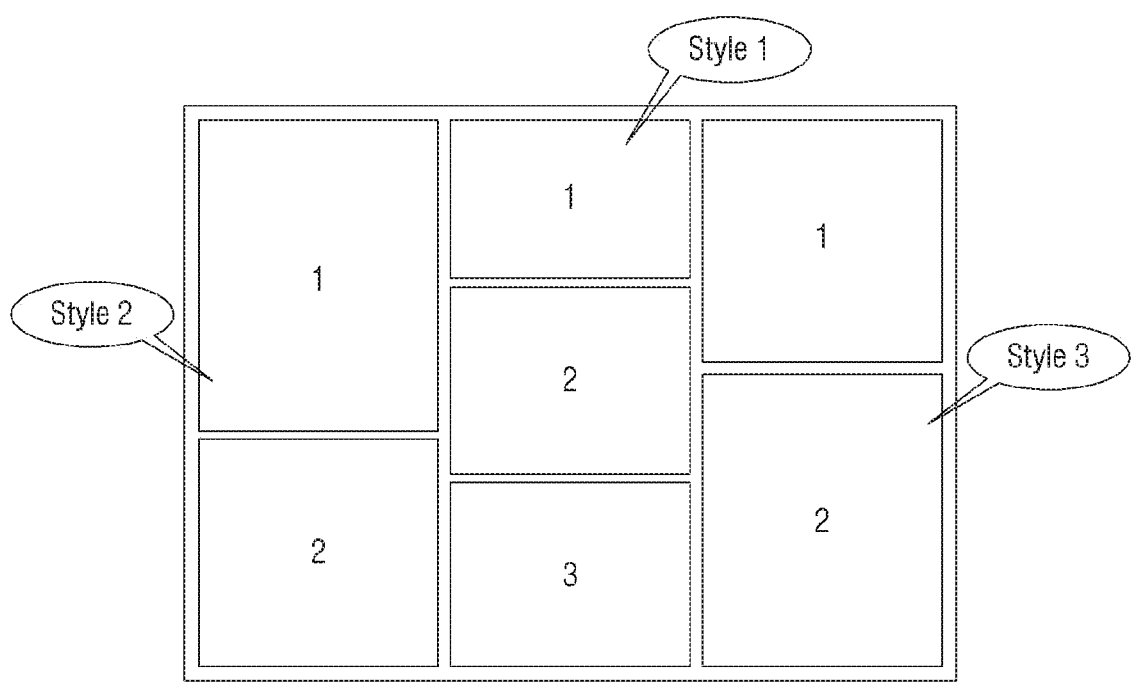
FIG. 10 is a view provided to describe an embodiment of arranging and providing an image by styles based on an aesthetic score according to an embodiment.

FIG. 10 is a view provided to describe an embodiment of arranging and providing an image by styles based on an aesthetic score according to an embodiment.

The processor 120 may arrange and provide the plurality of images by styles through the various templates. As described above, the template may be templates having different shapes or different sizes.

For example, as illustrated in FIG. 10, the processor 120 may arrange and provide the plurality of images according to the aesthetic score by styles through the square template of different sizes.

In the meantime, the styles provided herein may be styles they are correlated. As an embodiment, in FIG. 10, the first style may be a human, a second style may be an animal, and a third style may be a human and an animal.

Accordingly, the disclosure may provide a user with a harmonious and stable image.

Figure 11:
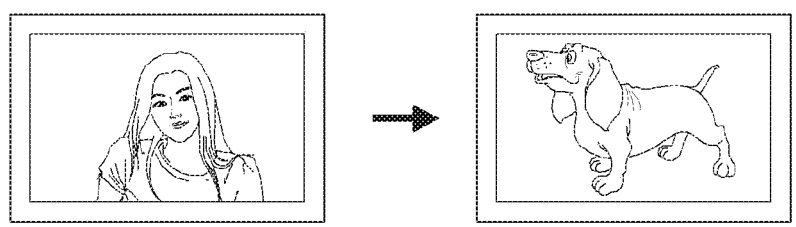
FIG. 11 is a view provided to describe an embodiment of sequentially providing each image according to an embodiment.

FIG. 11 is a view provided to describe an embodiment of sequentially providing each image according to an embodiment.

The processor 120 may provide one image having the highest aesthetic score from among the plurality of images.

The processor 120 may sequentially one image in a descending order of the aesthetic score.

Specifically, the processor 120 may sequentially provide one image at a preset time interval in a descending order of the aesthetic score. Here, the preset time interval may be set in a product extraction step, and may be set and changed according to a user command. For example, a preset time interval may be set and changed in various manners such as three seconds, five seconds, or the like.

Here, the processor 120 may sequentially provide one image having a high aesthetic score, fro, among the entire images, and sequentially provide one image having a high aesthetic score by styles from the entire images.

For example, the processor 120 may provide an image having the highest aesthetic score from the first style, and then provide an image having the highest aesthetic score from the second style.

In the meantime, in the case where arranging and providing the plurality of images in one screen as illustrated in FIGS. 6 to 10, the processor 120 may change and provide the screen in a predetermined time interval. For example, when 100 images are input, the processor 120 may arrange and provide images in a unit of 10 on one screen.

Figure 12:
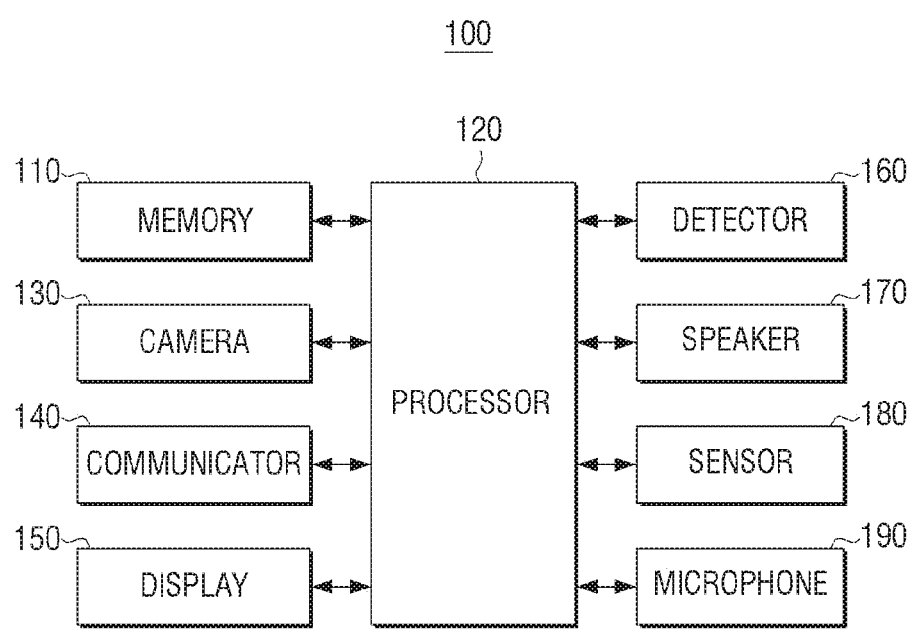
FIG. 12 is a detailed block diagram provided to describe an electronic apparatus according to an embodiment.

FIG. 12 is a detailed block diagram provided to describe an electronic apparatus according to an embodiment.

Referring to FIG. 12, the electronic apparatus 100 according to an embodiment may include a memory 110, a camera 130, a communicator 140, a display 150, a detector 160, a speaker 170, a sensor 180, a microphone 190, and the processor 120. The descriptions overlapped with the foregoing will be shortened or omitted.

The memory 110 stores various modules for driving the electronic apparatus 100. For example, the memory 110 may store software including a base module, a sensing module, a communication module, a presentation module, a web browser module, and a service module. At this time, the base module is a basic module that processes signals transmitted from the respective hardware included in the electronic apparatus 100 and transfers the signals to an upper layer module. The sensing module is a module for collecting information from various sensors and analyzing and managing collected information, and may include a face recognition module, a voice recognition module, a motion recognition module, a near-field communication (NFC) recognition module, and the like. The presentation module is a module for constructing a display screen, and may include a multimedia module for reproducing and outputting multimedia contents, a UI, and a UI rendering module for performing graphics processing. The communication module is a module for performing communication with the outside. The web browser module refers to a module that accesses a web server by performing web browsing. The service module is a module that includes various applications for providing various services.

The camera 130 may photograph various subjects.

For example, the camera 130 may photograph a user with a smiling facial expression, a user with a crying facial expression, a strolling dog, the mountain, the sea, or the like.

When the image obtained through the camera 130 is classified based on the aesthetic score and style through the AI model, the processor 120 may arrange and provide an image based on the classification result.

The camera 130 may be implemented as a dual camera having a plurality of camera modules. This is merely exemplary, and the camera 130 may be implemented as one camera module.

The communicator 140 may communicate with an external device and transceive various data.

Specifically, the communicator 140 may communicate with an external device and receive various images. Here, the external device may be a smartphone or various electronic apparatuses such as a PC, a smart TV, a server, or the like.

In addition, the communicator 140 may transmit an image that is arranged based on the aesthetic score and style to the external device (not shown). Here, the external device (not shown) may be an electronic apparatus such as a smart TV including a display. Accordingly, the external device (not shown) may display an image arranged based on the aesthetic score and style.

For this purpose, the communicator 140 may include a wireless communication chip, a W-Fi chip, a Bluetooth chip, or the like.

When the image obtained through the communicator 140 is classified based on the aesthetic score and style through the AI model, the processor 120 may arrange and provide an image based on the classification result.

The display 150 may display various images. In particular, the display 150 may arrange and display an image based on the aesthetic score and style.

The display 150 may be implemented as various types of displays such as a liquid crystal display (LCD), plasma display panel (PDP), or the like. In the display 150, a backlight unit, a driving circuit which may be implemented as a format such as an a-si TFT, low temperature poly silicon (LTPS) TFT, organic TFT (OTFT), or the like, may be included as well. In the meantime, the display 150 may be combined with a touch sensor and implemented as a touch screen.

The detector 160 may be implemented as various sensors for sensing a user command. For example, the detector 160 may include a touch detector.

The speaker 170 is a component outputting various audio data on which various processes such as decoding, amplification, noise filtering, and the like, are performed by an audio processor (not illustrated). In addition, the speaker 170 may output various notification sounds or a voice message. According to an embodiment, the speaker 170 may output audio when an image is photographed by the camera 130, or an image is arranged and provided based on the aesthetics score and style.

The sensor 180 may sense a movement of the electronic apparatus 100. To be specific, the sensor 180 may be implemented as an accelerometer, a gyro sensor, or a geomagnetic sensor, and sense a movement of the electronic apparatus 100.

The sensor 180 may sense ambient illuminance. Specifically, the sensor 180 may be implemented as an illuminance sensor and sense illuminance, a direction of external light incident on the electronic apparatus 100, brightness, or the like.

The microphone 190 may receive a user voice. Here, the user voice may be various voices such as a user voice for controlling a camera or a user voice requesting to arrange and output a user voice or an image, or the like.

The processor 120 controls overall operations of the electronic apparatus 100.

The processor 120 may correct an image based on ambient illuminance sensed by the sensor 180.

Specifically, the processor 120 may correct at least one of temperature and brightness of the background image, based on at least one of color temperature and brightness information of external light that is sensed by the illuminance sensor.

For example, the processor 120 may correct entire brightness of the background image to be dark, when it is determined that intensity of light of external light is low, based on the brightness information obtained from the illuminance sensor.

When a user voice to arrange and provide an image is received through the microphone 190, the processor 120 may control the display 150 to display an image that is arranged based on the aesthetic score and style.

Specifically, when a user voice to arrange and display an image is received through the microphone 190, the processor 120 may arrange an image based on the aesthetic score and style through the AI model, and control the display 150 to arrange and display an image based on the classification result.

Figure 13:
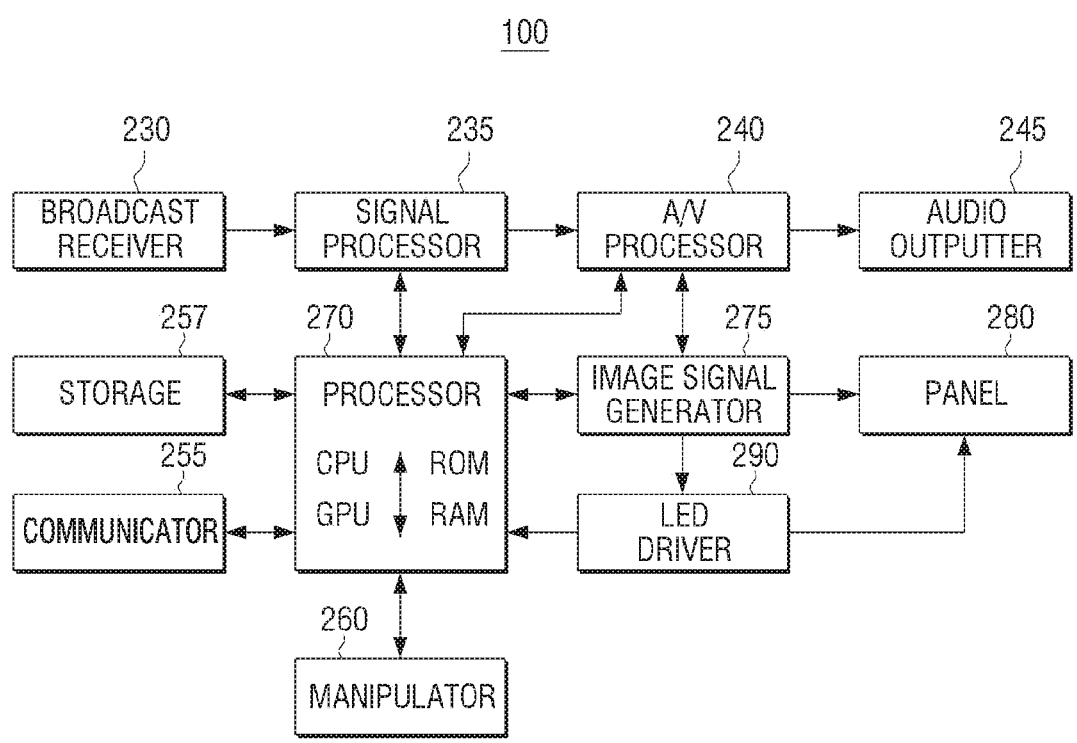
FIG. 13 is a detailed block diagram provided to describe a case in which an electronic apparatus is implemented as a broadcast receiving device according to an embodiment.

FIG. 13 is a detailed block diagram provided to describe a case in which an electronic apparatus is implemented as a broadcast receiving device according to an embodiment.

The electronic apparatus 100 according to an embodiment may be implemented as a broadcast receiving device.

Referring to FIG. 13, the electronic apparatus 100 according to an embodiment may include a broadcast receiver 230, a signal separator 235, an audio/video (A/V) processor 240, an audio outputter 245, a storage 257, a communicator 255, a manipulator 260, a processor 270, an image signal generator 275, a panel 280, and a light emitting diode (LED) driver 290.

The signal separator 235 separates the broadcasting signal received from the broadcast receiver 230 into an image signal, an audio signal, and an additional information signal. The signal separator 235 transmits the image signal and the audio signal to the A/V processor 240.

The A/V processor 240 may perform signal processing such as video decoding, video scaling, and audio decoding for the image signal and audio signal which are inputted from the broadcast receiver 230 and the storage 257. The AN processor 240 may transmit the image signal to the image signal generator 220 and transmit an audio signal to the audio outputter 145.

The audio outputter 245 may convert the audio signal received from the A/V processor 240 into sound and output the sound through the speaker (not shown).

The image signal generator 275 generates a graphic user interface (GUI). The image signal generator 275 adds the generated GUI to the image received from the A/V processor 240. The image signal generator 275 transmits the image signal corresponding to the image to which the GUI is added to the panel 280. Accordingly, the panel 280 may display various kinds of information provided by the display device 200 and an image transmitted from the image signal generator 275.

The image signal generator 275 may extract luminance information corresponding to the image signal and generate a dimming signal corresponding to the extracted luminance information. The image signal generator 275 may provide the generated dimming signal to the panel 280. This dimming signal may be a pulse width modulation (PWM) signal. In the embodiment, it has been described that the image signal generator 275 generates a dimming signal and provides the dimming signal to the panel 280. However, the panel 280 may generate the dimming signal by itself.

The panel 280 displays an image. The panel 280 may be implemented as various types of displays such as a liquid crystal display (LCD), organic light emitting diodes (OLED) display, or the like. In the panel 280, a backlight unit, a driving circuit which may be implemented as a format such as an a-si TFT, low temperature poly silicon (LTPS) TFT, organic TFT (OTFT), or the like, may be included as well. In the meantime, the panel 280 may be combined with a touch sensor and implemented as a touch screen.

The storage 250 may store image contents. To be specific, the storage 257 may receive, from the A/V processor 240, image contents in which image and audio are compressed and store the same. The storage 250 may be implemented as a hard disk, a non-volatile memory, volatile memory, or the like.

The manipulator 260 may be implemented as a touch screen, a touch pad, a key button, a key pad, or the like. According to an embodiment, the manipulator 260 is an input interface.

The communicator 255 is a configuration to perform communication with various types of external devices according to various types of communication methods. The communicator 255 may include a W-Fi chip and a Bluetooth chip. The processor 270 may communicate with various types of external devices using the communicator 255.

In the meantime, the electronic apparatus 100 may further include a USB port to which a USB connector may be connected, various external input ports for connecting to various external terminals, such as a headset, mouse, LAN, a digital multimedia broadcasting (DMB) chip for receiving and processing the DMB signal, or the like.

The electronic apparatus 100 may further include a power supplier (not show) and a sensing unit (not shown) in addition to the configurations of FIG. 13. The power supplier supplies power to each configuration in the electronic apparatus 100. The sensing unit may include various sensing devices such as a camera, a motion detector, or the like.

The electronic apparatus 100 may further include an interface (not shown) which may be connected to an image providing device such as a set-top box. Here, the interface may be a high-definition multimedia interface (HDMI) port, a component input port, a red-green-blue (RGB) port, a digital visual interface (DVI) port, a display port (DP), a USB port, or the like.

Accordingly, the electronic apparatus 100 may receive, from the image providing device such as a set-top box, a broadcast signal, an image signal for the contents, an audio signal or the like, through the interface (not shown).

The electronic apparatus 100 may process an image signal received from the image providing device through the interface and display an image through the panel 280, convert the received audio signal to sound, and output the sound through a speaker (not shown).

The electronic apparatus 100 may further include a microphone (not shown) for receiving a user voice. Here, the user voice may be various voices such as a voice to control a camera of the electronic apparatus 100 or a voice to arrange and display an image on the panel 280, or the like.

The processor 270 controls overall operations of the electronic apparatus 100. The processor 270 may include a central processing unit (CPU), a graphics processing unit (GPU), read-only memory (ROM), and random-access memory (RAM), as illustrated in FIG. 13.

The processor 270 may control the image signal generator 275 and the panel 280 to display an image according to a control command input through the manipulator 260.

In particular, when a user voice to arrange and display an image is received through a microphone (not shown), the processor 270 may control the panel 280 to display an image arranged based on the aesthetic score and style.

The processor 270, when a user voice for displaying the background image is received through the microphone (not shown), may control the communicator 255 to transmit a signal requesting transmission of the background image to the electronic apparatus 100.

Specifically, when the user voice to display the background image is received through the microphone (not shown), the processor 270 may transmit, to an external device (not shown), a signal requesting transmission of the image through wireless communication such as Bluetooth or Here, the external device (not shown) may be a smartphone, a server, or the like. The external device (not shown) may transmit a plurality of images to the electronic apparatus 100. When a plurality of images are received, the electronic apparatus 100 may arrange the images based on the aesthetic score and style through the AI model, and display the arranged image based on the classification result.

It has been described that the image is arranged by the electronic apparatus 100, but arranging of an image may be performed by an external device (not shown) such as a server.

According to an embodiment, when the electronic apparatus 100 transmits a plurality of images to an external device (not shown), the external device (not shown) may classify the plurality of images based on the aesthetic score and style through the AI model, and transmit the arranged image to the electronic apparatus 100 based on the classification result.

Accordingly, the processor 270 may display an image that is arranged based on the aesthetic score and style through the panel 280.

Figure 14:
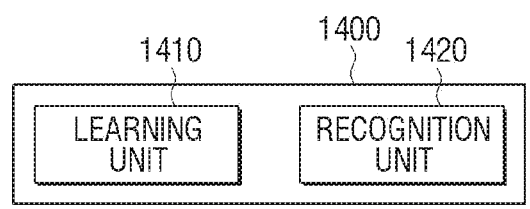
FIG. 14 is a view provided to describe an operation of an electronic apparatus using an artificial intelligence model according to an embodiment.

FIG. 14 is a view provided to describe an operation of an electronic apparatus using an artificial intelligence model according to an embodiment.

A processor 1400 may include at least one of a learning unit 1410 and a recognition unit 1420. Here, the processor 1400 may correspond to the process 120 of FIG. 2.

The learning unit 1410 may generate or train a recognition model having a criterion for determining a predetermined situation. The learning unit 1410 may generate a recognition model having a determination criterion using the collected learning data.

For example, the learning unit 1410 may generate, train, or update an AI model that classifies a plurality of prestored images based on the aesthetic score and style using a plurality of prestored images as the learning data.

The recognition unit 1420 may estimate response information for predetermined data using the predetermined data as the input data of the learned recognition model.

For example, the recognition unit 1420 may obtain (or estimate, deduct) the response information for the corresponding image, by using the predetermined image as the input data of the learned recognition model.

According to an embodiment, at least a portion of the learning unit 1410 and the recognition unit 1420 may be implemented as software modules or at least one hardware chip form and mounted in the electronic apparatus.

For example, at least one of the learning unit 1410 and the recognition unit 1420 may be manufactured in the form of an exclusive-use hardware chip for artificial intelligence (AI), or a conventional general purpose processor (e.g., a CPU or an application processor) or a graphics-only processor (e.g., a GPU) and may be mounted on various electronic apparatuses or object recognition devices as described above. Herein, the exclusive-use hardware chip for artificial intelligence is a dedicated processor for probability calculation, and it has higher parallel processing performance than existing general purpose processor, so it can quickly process computation tasks in artificial intelligence such as machine learning. When the learning unit 1410 and the recognition unit 1420 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

In this case, the learning unit 1410 and the recognition unit 1420 may be mounted on one electronic apparatus, or may be mounted on separate electronic apparatuses, respectively. For example, one of the learning unit 1410 and the recognition unit 1420 may be implemented in the electronic apparatus 100, and the other one may be implemented in an external server. In addition, the learning unit 1410 and the recognition unit 1420 may provide the model information constructed by the learning unit 1410 to the recognition unit 1420 via wired or wireless communication, and provide data which is input to the recognition unit 1420 to the learning unit 1410 as additional data.

Figure 15:
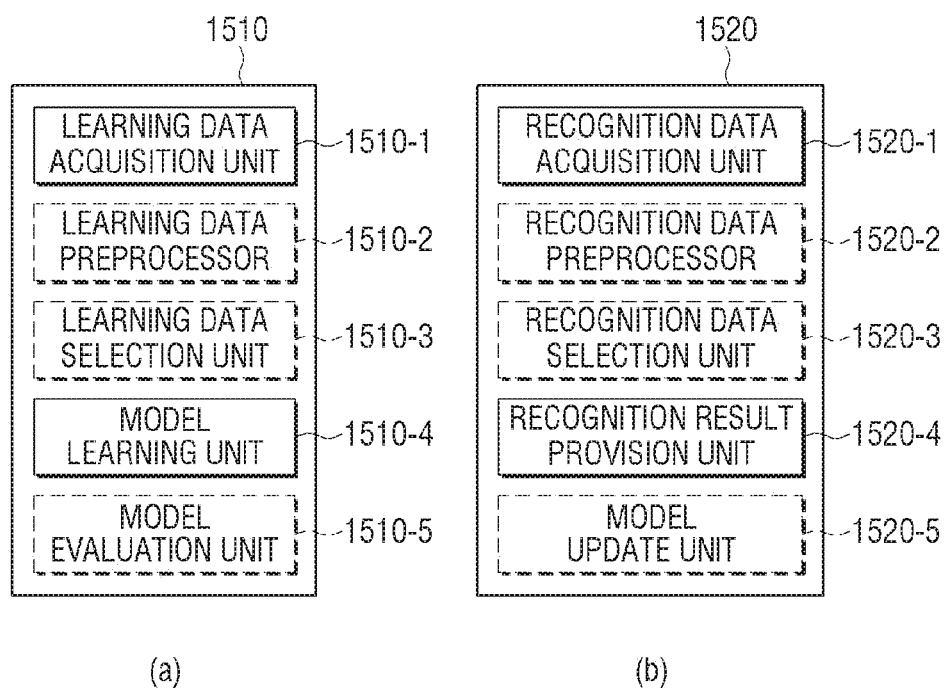
FIG. 15 is a block diagram of a learning unit and a recognition unit according to an embodiment.

FIG. 15 is a block diagram of a learning unit and a recognition unit according to an embodiment.

Referring to FIG. 15, a learning unit 1510 according to some embodiments may implement a learning data acquisition unit 1510-1 and a model learning unit 1510-4. The learning unit 1510 may further selectively implement at least one of a learning data preprocessor 1510-2, a learning data selection unit 1510-3, and a model evaluation unit 1510-5.

The learning data acquisition unit 1510-1 may obtain learning data necessary for the recognition model for inferring a recognition subject. In the embodiment, the learning data acquisition unit 1510-1 may obtain a plurality of prestored images as learning data. The learning data may be data collected or tested by the learning unit 1510 or the manufacturer of the learning unit 1510.

The model learning unit 1510-4 may use the learning data so that the recognition model has a determination criterion regarding how the recognition model determines a predetermined recognition subject. For example, the model learning unit 1510-4 may train the recognition model through supervised learning using at least some of the learning data as a reference for determination. Alternatively, the model learning unit 1510-4 may train, for example, the recognition model to find the determination criteria for determining a circumstance through self-learning using learning data without any guidance. Also, the model learning unit 1510-4 may train the recognition model through reinforcement learning using, for example, feedback as to whether the result of determining a circumstance according to learning is correct. Further, the model learning unit 1510-4 may train the recognition model using, for example, a learning algorithm including an error back-propagation method or a gradient descent.

In addition, the model learning unit 1510-4 may learn a selection criterion about which learning data should be used for estimating a recognition target using input data.

The model learning unit 1510-4 may determine the recognition model having a great correlation between the input learning data and the basic learning data as the recognition model to be learned when there are a plurality of recognition models previously constructed. For example, basic learning data may be pre-classified based on various criteria such as an area where the learning data is generated, time when the learning data is generated, the size of the learning data, a genre of the learning data, a generator of the learning data, a type of an object in the learning data, or the like.

When the recognition model is learned, the model learning unit 1510-4 may store the learned recognition model. In this case, the model learning unit 1510-4 may store the learned recognition model in the memory of the electronic apparatus 100. Alternatively, the model learning unit 1510-4 may store the learned recognition model in a memory of a server connected to the electronic apparatus 100 via a wired or wireless network.

The learning unit 1510 may further implement a learning data preprocessor 1510-2 and a learning data selection unit 1510-3 to improve the response result of the recognition model or to save resources or time required for generation of the recognition model.

The learning data preprocessor 1510-2 may preprocess obtained data so that the data obtained in the learning for determining a situation may be used. The learning data preprocessor 1510-2 may process the obtained data into a predetermined format so that the model learning unit 1510-4 may use the obtained data for learning for determination of a situation.

The learning data selection unit 1510-3 may select data required for learning from the data acquired by the learning data acquisition unit 1510-1 or the data preprocessed by the learning data preprocessor 1510-2. The selected learning data may be provided to the model learning unit 1510-4. The learning data selection unit 1510-3 may select learning data necessary for learning from the acquired or preprocessed data in accordance with a predetermined selection criterion. The learning data selection unit 1510-3 may also select learning data according to a predetermined selection criterion by learning by the model learning unit 1510-4.

The learning unit 1510 may further implement the model evaluation unit 1510-5 to improve a response result of the artificial intelligence model.

The model evaluation unit 1510-5 may input evaluation data to the recognition model, and if the analysis result which is output from the evaluation result does not satisfy a predetermined criterion, the model evaluation unit may make the model learning unit 1510-4 learn again. In this case, the evaluation data may be predetermined data to evaluate the recognition model.

For example, when the number or ratio of the evaluation data of which the analysis result is not accurate exceeds a predetermined threshold value, from among the analysis results of the recognition model learned with respect to the evaluation data, the model evaluation unit 1510-5 may evaluate that a predetermined criterion is not satisfied.

When there are a plurality of learned recognition models, the model evaluation unit 1510-5 may evaluate whether each learned recognition model satisfies a predetermined criterion, and determine the model which satisfies a predetermined criterion as a final recognition model. Here, when there are a plurality of models that satisfy a predetermined criterion, the model evaluation unit 1510-5 may determine one or a predetermined number of models which are set in an order of higher evaluation score as a final recognition model.

According to an embodiment, the recognition unit 1520 may include the recognition data acquisition unit 1520-1 and the recognition result provision unit 1520-4.

In addition, the recognition unit 1520 may further implement at least one of a recognition data preprocessor 1520-2, a recognition data selection unit 1520-3, and a model update unit 1520-5 in a selective manner.

The recognition data acquisition unit 1520-1 may obtain data necessary for determining a situation. The recognition result provision unit 1520-4 may apply the data obtained from the recognition data acquisition unit 1520-1 to the learned recognition model as an input value to determine a situation. The recognition result provision unit 1520-4 may provide an analysis result according to an analysis purpose of data. The recognition result provision unit 1520-4 may apply the data selected by the recognition data preprocessor 1520-2 or the recognition data selection unit 1520-3 to be described later to the recognition model to obtain the analysis result. The analysis result may be determined by the recognition model.

The recognition unit 1520 may further implement the recognition data preprocessor 1520-2 and the recognition data selection unit 1520-3 in order to improve an analysis result of the recognition model or save resources or time to provide the analysis result.

The recognition data preprocessor 1520-2 may preprocess the acquired data so that the acquired data may be used to determine a situation. That is, the recognition data preprocessor 1520-2 may process the obtained data into the predefined format so that the recognition result provision unit 1520-4 may use the obtained data to determine a situation.

The recognition data selection unit 1520-3 may select data required for determining a situation from the data acquired by the recognition data acquisition unit 1520-1 or the data preprocessed by the recognition data preprocessor 1520-2. The selected data may be provided to the recognition result provision unit 1520-4. The recognition data selection unit 1520-3 may select some or all of the obtained or preprocessed data according to a predetermined selection criterion for determining a situation. The recognition data selection unit 1520-3 may also select data according to a predetermined selection criterion by learning by the model learning unit 1510-4.

The model update unit 1520-5 may control the updating of the recognition model based on the evaluation of the analysis result provided by the recognition result provision unit 1520-4. For example, the model update unit 1520-5 may provide the analysis result provided by the recognition result provision unit 1520-4 to the model learning unit 1510-4 so that the model learning unit 1510-4 may ask for further learning or updating the recognition model.

Figure 16:
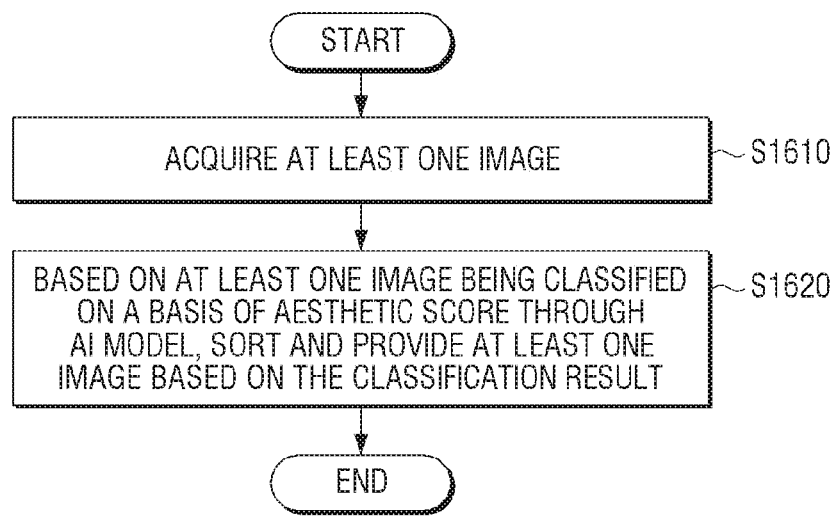
FIG. 16 is a flowchart provided to describe an operation of an electronic apparatus according to an embodiment.

FIG. 16 is a flowchart provided to describe an operation of an electronic apparatus according to an embodiment.

The electronic apparatus 100 may obtain at least one image in S1610.

Here, the image may be an image that is photographed through a camera of the electronic apparatus 100, and an image prestored in the electronic apparatus 100 or an image received from an external device (not shown).

For example, the electronic apparatus 100 may obtain an image including a person with a smiling facial expression, an image including a person with a crying facial expression, an image including a strolling dog, or the like.

When at least one image is classified based on the aesthetic score through the AI model, the electronic apparatus 100 may arrange and provide an image based on the classification result in S1620.

For example, the electronic apparatus 100 may display an image in which a plurality of images are arranged in a descending order of the aesthetic score, if the plurality of images including a person with a smiling facial expression, an image including a strolling dog, an image including a dog waving a tail, or the like, are classified based on the aesthetic score using the AI model.

The electronic apparatus 100 may arrange and provide a plurality of images by styles according to the aesthetic score.

To be specific, when a style of an image is classified through the AI model, the electronic apparatus 100 may arrange and provide the plurality of images in a descending order of the aesthetic score by styles.

For example, when the plurality of images are classified into a human style, an animal style, and a landscape style through the AI model, the electronic apparatus 100 may provide an image in which the plurality of images are arranged in a descending order of the aesthetic score by styles.

As described above, in the disclosure, since a plurality of images are arranged and provided in a descending order of the aesthetic value, a user may preferentially receive an image of high quality. In addition, the disclosure may provide a plurality of images classified by styles, so that the user may appreciate a harmoniously arranged image.

The methods according to various embodiments may be implemented by software upgrade and hardware upgrade of a related art electronic apparatus only.

The various embodiments described above may be implemented through an embedded server provided in the electronic apparatus or a server outside the electronic apparatus.

The control method of the electronic apparatus according to the above-described various embodiments may be implemented as a program and stored in various recording media. That is, a computer program that is processed by various processors and may execute the various control methods described above may be used in a state stored in the recording medium.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Hereinabove, although the embodiments of the disclosure have been shown and described, it should be understood that the disclosure is not limited to the disclosed embodiments and may be variously modified without departing from the spirit and the scope of the disclosure. Therefore, the modifications should not be understood separately from the technical spirit or scope of the disclosure.

What is claimed is:

1. An electronic apparatus, comprising:
a memory; and
a processor configured to:
store a plurality of images in the memory, each image of the plurality of images having an aesthetic score determined by an artificial intelligence (AI) model,
arrange the plurality of images based on the aesthetic score of each image of the plurality of images, and
provide the arranged plurality of images for display,
wherein the AI model incudes a plurality of layers with different depths, and is configured to, for each image of the plurality of images:
extract features of the image from the plurality of layers, and
determine the aesthetic score of the image based on the extracted features.

2. The electronic apparatus of claim 1, wherein:
the plurality of layers comprise a first layer and a second layer that is relatively deeper than the first layer, and
the AI model is further configured to, for each image of the plurality of images:
extract a first feature of the image from the first layer, and extract a second feature of the image from the second layer, the second feature including the first feature.

3. The electronic apparatus of claim 1, wherein the processor is further configured to arrange the plurality of images based on a style of each image of the plurality of images and the aesthetic score of each image of the plurality of images.

4. The electronic apparatus of claim 3, wherein:
the plurality of layers comprise a first layer and a second layer that is relatively deeper than the first layer, and
the AI model is further configured to:
determine, for each image of the plurality of images, the aesthetic score of the image based on a first feature of the image extracted from the first layer and a second feature of the image extracted from the second layer, and determine the style of the image based on a third feature of the image extracted from the second layer.

5. The electronic apparatus of claim 3, wherein the processor is further configured to:
display the arranged plurality of images.

6. The electronic apparatus of claim 3, wherein the processor is further configured to:
based on two images of the plurality of images being respectively classified to a first style and a second style, identify a correlation between the first style and the second style, and use the identified correlation to arrange the plurality of images.

7. The electronic apparatus of claim 3, wherein, for each image of the plurality of images:
the aesthetic score of the image is determined based on at least one of an angle of an object included in the image, a diversity of colors included in the image, and a photographing technique applied to the image, and
the style of the image is identified based on at least one of a human, an animal, a building, and a landscape included in the image.

8. The electronic apparatus of claim 1, wherein the processor is further configured to:
provide an image with a highest aesthetic score from among the plurality of images, or sequentially provide an image in a descending order of the aesthetic score based on a predetermined time interval.

9. A method comprising:
obtaining a plurality of images;
for each image of the plurality of images,
extracting, by an artificial intelligence (AI) model including a plurality of layers with different depths, features of the image from the plurality of layers, and
determining, by the AI model, an aesthetic score of the image based on the extracted features;
arranging the plurality of images based on the aesthetic score of each image of the plurality of images; and
providing the arranged plurality of images for display.

10. The method of claim 9, wherein:
the plurality of layers comprise a first layer and a second layer that is relatively deeper than the first layer, and
the extracting comprises, for each image of the plurality of images:
extracting a first feature of the image from the first layer, and extract a second feature of the image from the second layer, the second feature including the first feature.

11. The method of claim 9, wherein the arranging further includes arranging the plurality of images based on a style of each image of the plurality of images and the aesthetic score of each image of the plurality of images.

12. The method of claim 11, wherein:
the plurality of layers comprise a first layer and a second layer that is relatively deeper than the first layer, and
the determining comprises, for each image of the plurality of images:
determining the aesthetic score of the image based on a first feature of the image extracted from the first layer and a second feature of the image extracted from the second layer, and
determining the style of the image based on a third feature extracted from the second layer.

13. The method of claim 11, wherein the providing comprises displaying the arranged plurality of images.

14. The method of claim 11, wherein the arranging further comprises, based on two images of the plurality of images being respectively classified to a first style and a second style, identifying a correlation between the first style and the second style, and using the correlation to arrange the plurality of images.

15. The method of claim 11, wherein,
for each image of the plurality of images:
the determining determines the aesthetic score of the image based on at least one of an angle of an object included in the image, a diversity of colors included in the image, and a photographing technique applied to the image, and
the method further comprises identifying, by the AI model, the style of the image based on at least one of a human, an animal, a building, and a landscape included in the image.

16. The method of claim 9,
wherein the providing further comprises providing an image with a highest aesthetic score from among the plurality of images, or sequentially providing an image in a descending order of the aesthetic score based on a predetermined time interval.

17. An apparatus comprising:
a memory; and
a processor, coupled to the memory, configured to:
for each image of a plurality of images,
provide the image to an artificial intelligence (AI) model including a plurality of layers with different depths, to extract, by the AI model, features of the image from the plurality of layers, and to determine, by the AI model, an aesthetic score of the image based on the extracted features;
arrange the plurality of images based on the aesthetic score of each image of the plurality of images; and
display the arranged plurality of images.

* * * * *